United States Patent
Lee

(10) Patent No.: US 9,925,989 B2
(45) Date of Patent: Mar. 27, 2018

(54) VEHICLE CONTROL APPARATUS AND METHOD FOR OPERATION IN PASSING LANE

(71) Applicant: Hyundai Motor Company, Seoul (KR)

(72) Inventor: Si Hyoung Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/182,026

(22) Filed: Jun. 14, 2016

(65) Prior Publication Data

US 2017/0129501 A1 May 11, 2017

(30) Foreign Application Priority Data

Nov. 10, 2015 (KR) .................. 10-2015-0157403

(51) Int. Cl.
| | |
|---|---|
| *B60W 50/14* | (2012.01) |
| *B60W 50/00* | (2006.01) |
| *G01C 21/00* | (2006.01) |
| *B60W 20/00* | (2016.01) |

(52) U.S. Cl.
CPC ............ *B60W 50/14* (2013.01); *B60W 50/00* (2013.01); *B60W 20/00* (2013.01); *B60W 2550/10* (2013.01); *B60W 2550/30* (2013.01)

(58) Field of Classification Search
CPC ....... G01C 21/00; B60W 20/00; B60W 50/00; B60W 50/14; B60W 50/143
See application file for complete search history.

(56) References Cited

U.S. PATENT DOCUMENTS

| | | | | |
|---|---|---|---|---|
| 7,027,915 | B2* | 4/2006 | Craine | G08G 1/096716 340/907 |
| 7,135,961 | B1* | 11/2006 | Operowsky | G01C 21/3629 340/425.5 |
| 7,609,172 | B2* | 10/2009 | Rozum | G08G 1/096716 340/901 |
| 7,739,036 | B2* | 6/2010 | Grimm | G08G 1/096716 340/905 |
| 9,122,933 | B2* | 9/2015 | Palan | G06K 9/00805 |
| 9,135,624 | B2* | 9/2015 | Basir | G08G 1/096741 |
| 9,631,943 | B2* | 4/2017 | Shashua | G01C 21/32 |
| 2007/0225908 | A1* | 9/2007 | Kim | G01C 21/3691 701/414 |
| 2008/0170122 | A1* | 7/2008 | Hongo | G06T 7/33 348/148 |

(Continued)

FOREIGN PATENT DOCUMENTS

| | | |
|---|---|---|
| JP | 2004-102655 A | 4/2004 |
| JP | 2008-262401 A | 10/2008 |

(Continued)

*Primary Examiner* — Yonel Beaulieu
(74) *Attorney, Agent, or Firm* — Mintz Levin Cohn Ferris Glovsky and Popeo, P.C.; Peter F. Corless

(57) ABSTRACT

A vehicle control method using an advanced driver assistance system (ADAS) is provided. The method includes detecting whether a vehicle travels on a road having regulation information of a passing lane and determining whether a specific lane having driving restriction information is present while the vehicle travels on the road. Whether the vehicle travels in the passing lane is detecting and a warning is output to a driver based on a peripheral state of the vehicle when the vehicle travels in the passing lane.

20 Claims, 12 Drawing Sheets

(56) References Cited

U.S. PATENT DOCUMENTS

| | | | |
|---|---|---|---|
| 2009/0224942 A1* | 9/2009 | Goudy | G08G 1/096783 340/905 |
| 2011/0012754 A1* | 1/2011 | Hatami | G08G 1/0962 340/905 |
| 2012/0232787 A1* | 9/2012 | Kunath | G01C 21/3461 701/423 |
| 2014/0266655 A1* | 9/2014 | Palan | G06K 9/00805 340/435 |
| 2014/0272811 A1* | 9/2014 | Palan | G07C 5/008 434/66 |
| 2014/0288810 A1* | 9/2014 | Donovan | G08G 1/0116 701/117 |
| 2015/0053066 A1* | 2/2015 | Hampiholi | B60W 50/14 84/602 |
| 2015/0328985 A1* | 11/2015 | Kim | H04N 5/23229 180/272 |
| 2016/0061613 A1* | 3/2016 | Jung | G01C 21/3632 701/49 |
| 2016/0221575 A1* | 8/2016 | Posch | B60W 50/0098 |
| 2016/0280224 A1* | 9/2016 | Tatourian | B60W 30/143 |

FOREIGN PATENT DOCUMENTS

| | | |
|---|---|---|
| JP | 2011-197915 A | 10/2011 |
| JP | 2014-139832 A | 7/2014 |
| KR | 1999-0062012 A | 7/1999 |
| KR | 10-1326943 B1 | 11/2013 |
| KR | 2014-0069691 A | 6/2014 |
| KR | 10-2014-0083636 A | 7/2014 |
| KR | 10-2014-0131601 A | 11/2014 |
| KR | 2015-0029471 A | 3/2015 |
| KR | 10-2015-0070832 A | 6/2015 |

\* cited by examiner

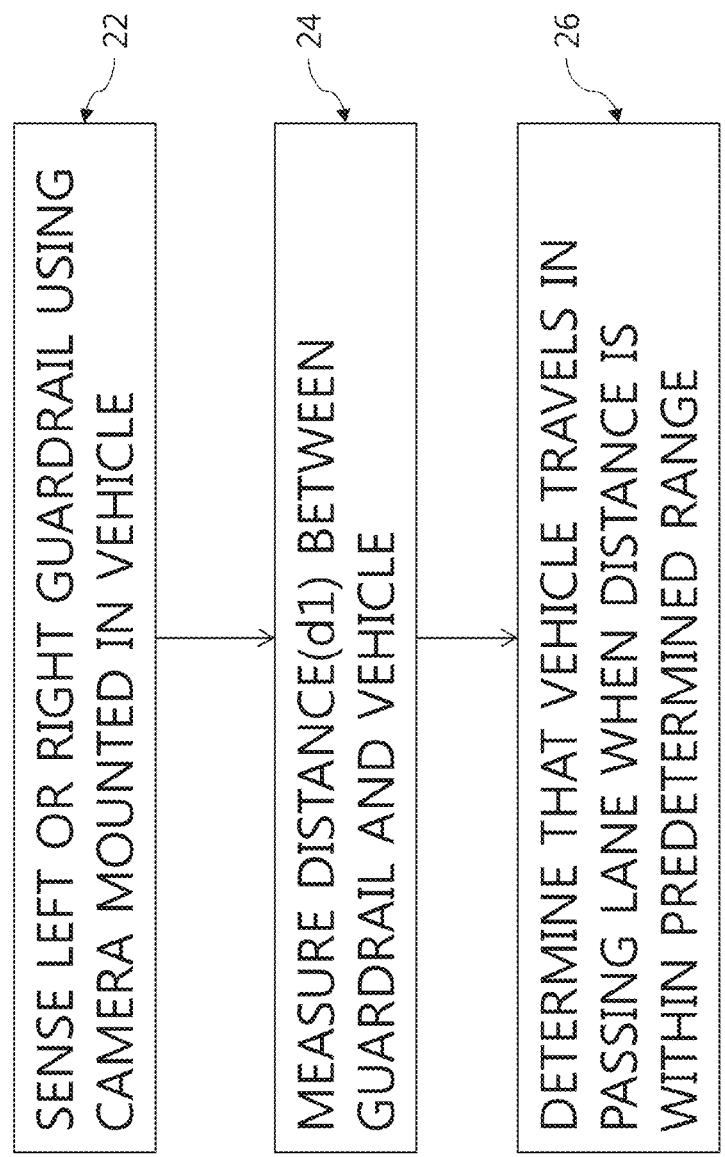
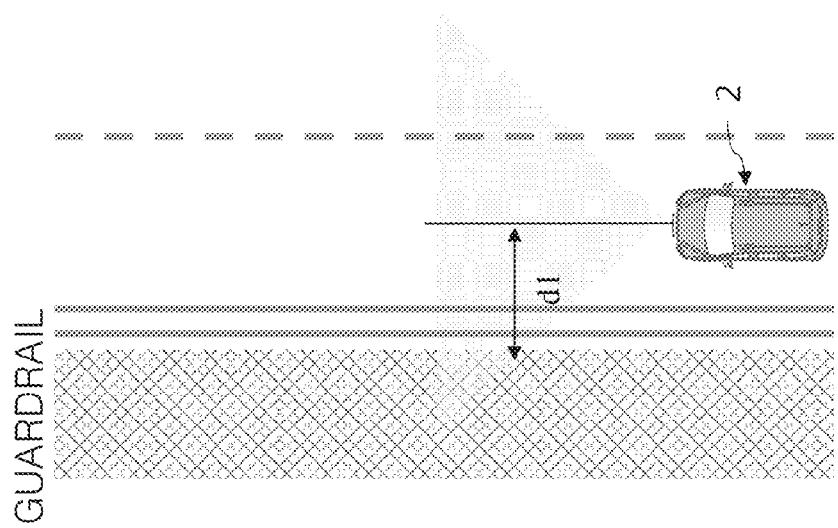
FIG. 2A

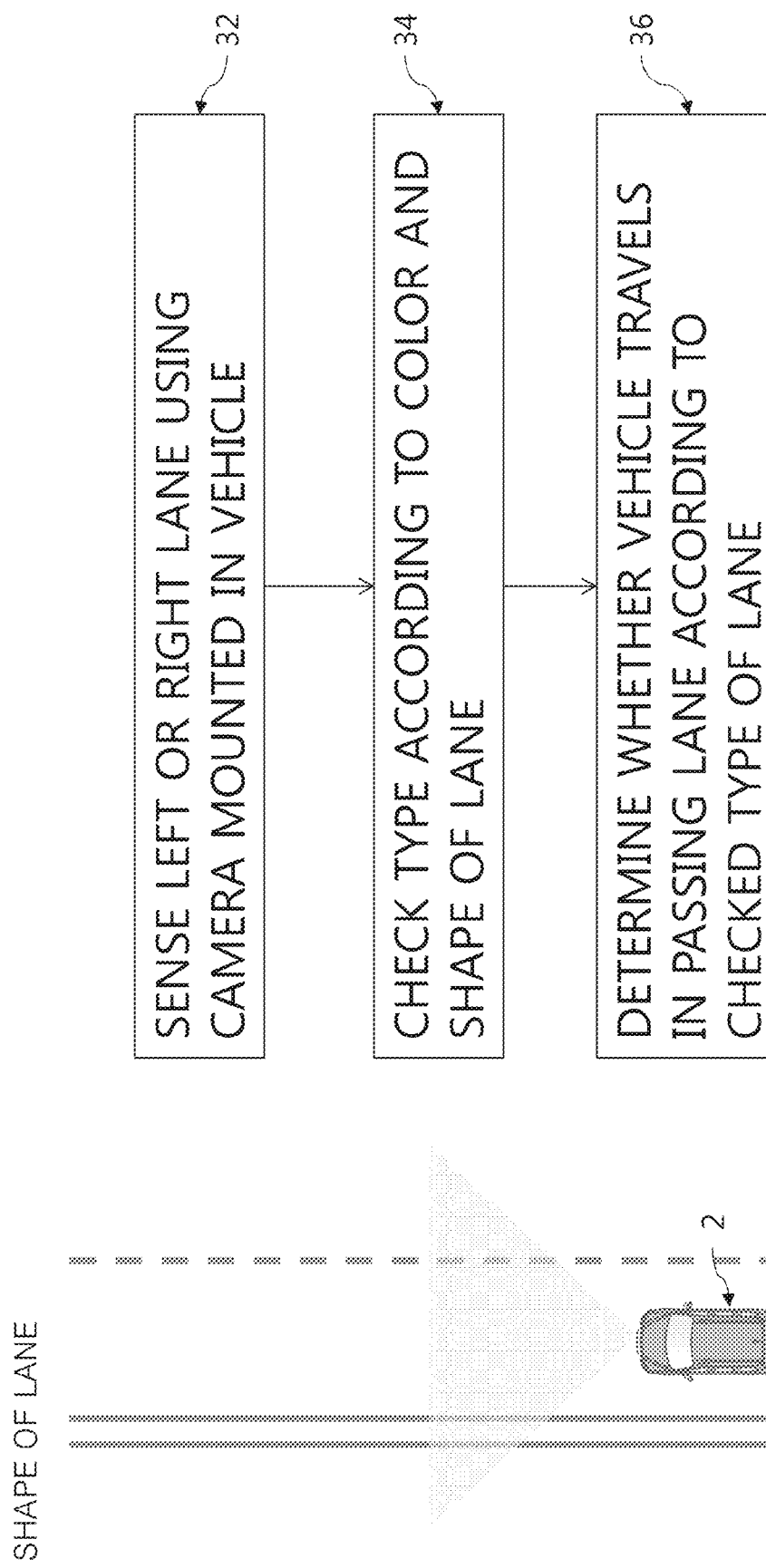

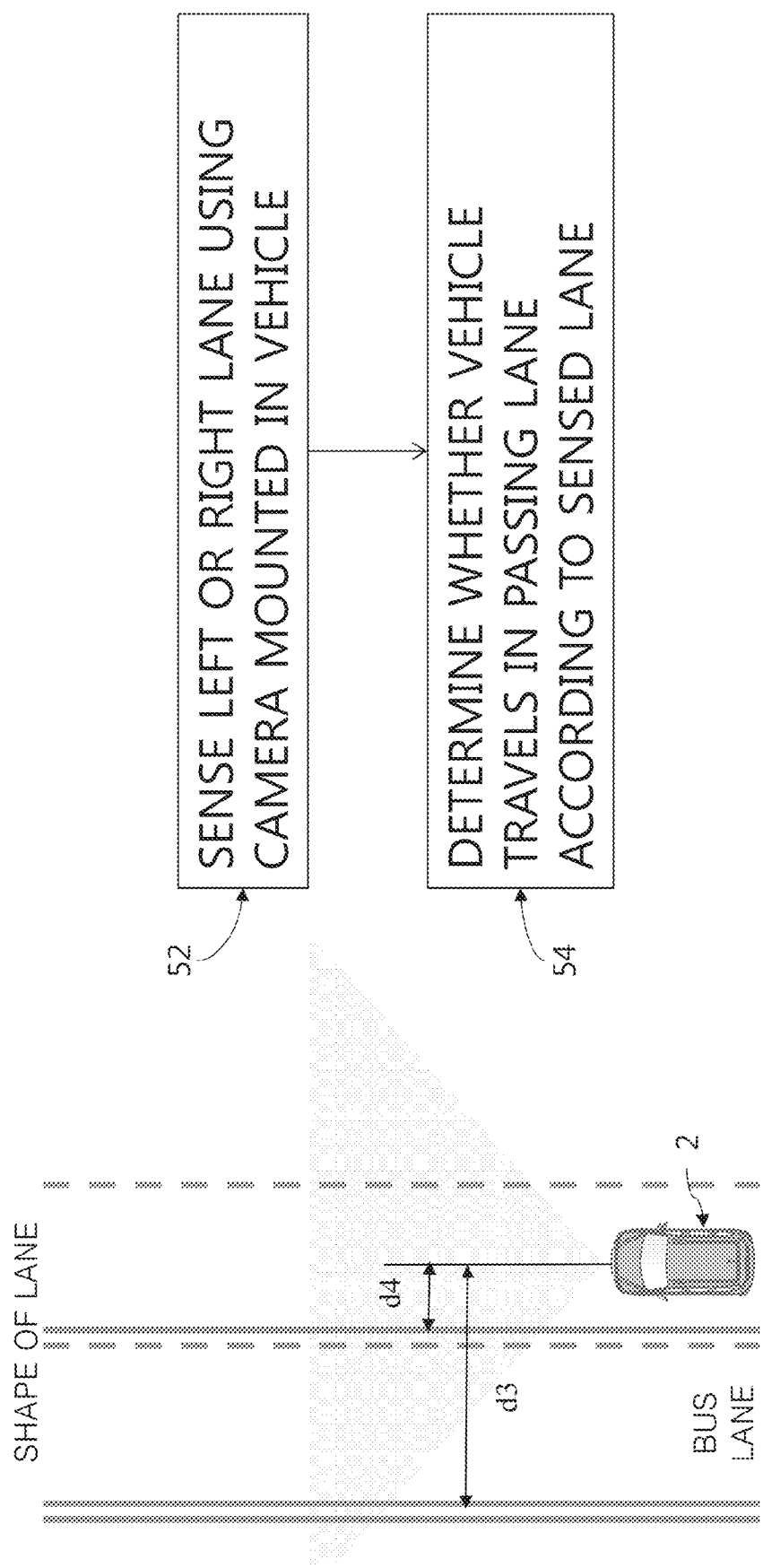

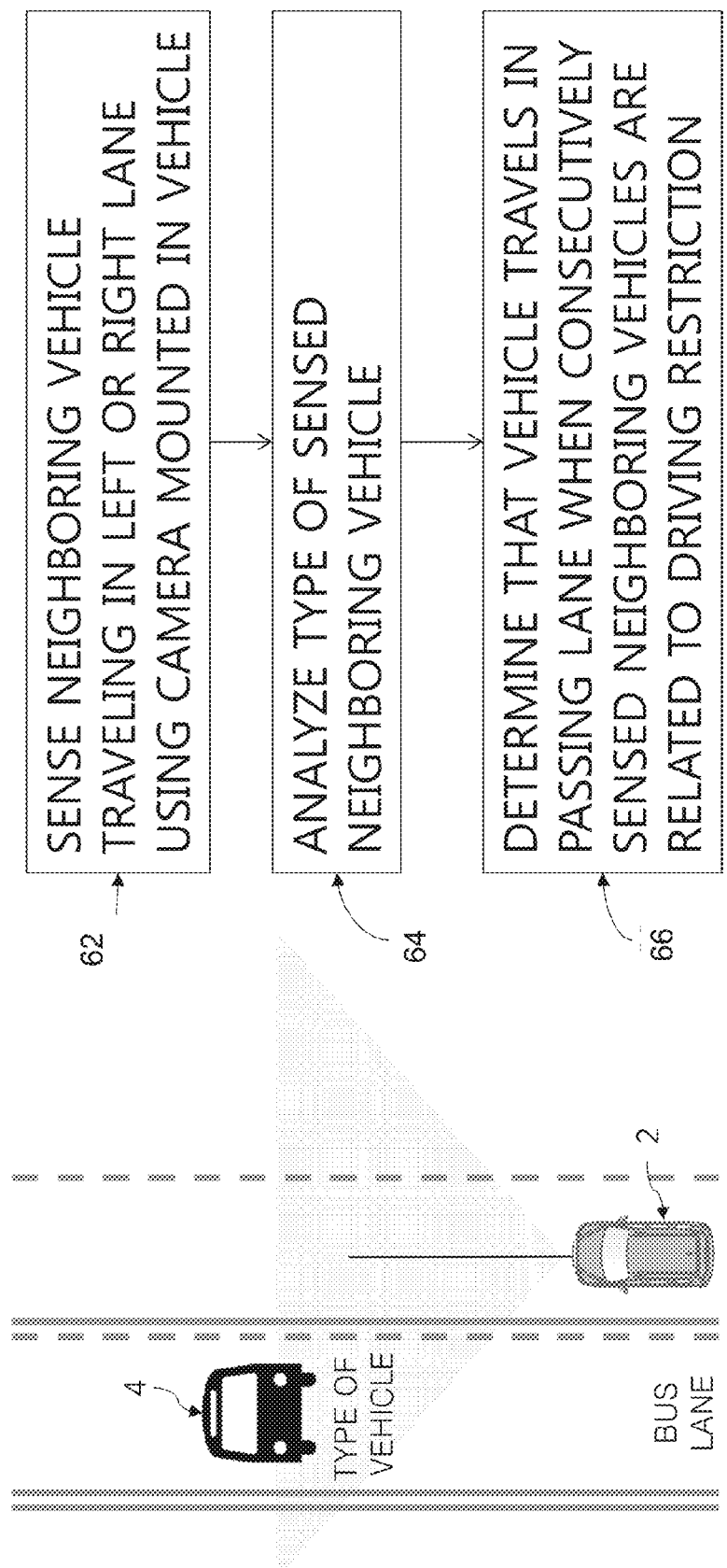

VEHICLE CONTROL APPARATUS AND METHOD FOR OPERATION IN PASSING LANE

CROSS REFERENCE TO RELATED APPLICATION(S)

This application claims the benefit of Korean Patent Application No. 10-2015-0157403, filed on Nov. 10, 2015, which is hereby incorporated by reference as if fully set forth herein.

BACKGROUND

Field of the Invention

The present invention relates to a vehicle control apparatus and safety method during driving and, more particularly, to an apparatus and method for recognizing a vehicle traveling in a passing lane and informing a driver of a peripheral state to lead the driver to change lanes.

Discussion of the Related Art

In a vehicle, an advanced driver assistance system (ADAS) capable of performing forward vehicle collision avoidance, lane departure warning, blind spot monitoring, improved rear monitoring, etc. has been developed as an advanced sensor and an intelligent display apparatus. The ADAS aids a driver in avoiding potential collisions or other risks while driving. Particularly, the ADAS senses the risk of an accident using a sensor and warns a driver about the risk of an accident via visual, acoustic and tactile elements to enable the driver to respond to or handle the dangerous situation. Such an apparatus does not merely provide a warning but instead has been developed into technology for automatically operating a vehicle through combination with a vehicle control system.

As one convenience apparatus of a vehicle, there is a smart cruise control (SCC) system for maintaining an appropriate distance between vehicles during driving. The SCC system automatically controls a throttle valve, brake and transmission of a vehicle based on the position of a preceding vehicle and a distance from the preceding vehicle, both of which are sensed by a front sensor mounted at the front side of the vehicle, to perform appropriate acceleration and deceleration, thereby maintaining an appropriate distance from the preceding vehicle. The SCC system performs constant speed control when a preceding vehicle is not present and performs inter-vehicle distance control to maintain a constant distance from the preceding vehicle when the preceding vehicle is detected.

When a driving road on which a vehicle is being driven includes a plurality of lanes, at least one lane may be defined as a passing lane or fast lane. In addition, a method of driving a vehicle in a passing lane is regulated via a law or rule to improve the flow of traffic. Accordingly, when a driver travels in a passing lane, a vehicle needs to sense that the vehicle is currently traveling in the passing lane and to provide an appropriate guide to the driver.

SUMMARY

Accordingly, the present invention provides a vehicle control apparatus and method for operation in a passing lane that substantially obviate one or more problems due to limitations and disadvantages of the related art. An object of the present invention is to provide an apparatus and method for sensing whether a vehicle travels in a passing lane using information from a navigation apparatus in consideration of additional lane restrictions at a specific position and providing a driver with vehicle control information or a driving guide in the passing lane.

Another object of the present invention is to provide an apparatus and method for differentiating between a passing lane and the other lanes on an expressway having restrictions to provide vehicle driving information, by taking specific area restriction (e.g., bus lane, etc.) into account in advance. Additionally, the present invention provides an apparatus and method for preventing an error or carelessness of a driver due to a late warning or non-warning by providing notification to a driver when a vehicle traveling in a passing lane is capable of being changed to a general driving lane regardless of a traveling speed and a traveling time in the passing lane. Another object of the present invention is to provide an apparatus and method capable of preventing an unnecessary warning upon determining that a traveling vehicle is passing another vehicle even when a high-speed vehicle approaches the traveling vehicle from behind.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a vehicle control method using an advanced driver assistance system (ADAS) includes determining whether a subject vehicle travels on a road having regulation information of a passing lane based at least on a first information delivered via a wireless network and/or provided by at least one first electric device mounted within the subject vehicle, determining whether a specific lane having driving restriction information is present while the vehicle travels on the road, based at least on a second information collected by at least one second electric device mounted within the subject vehicle, to detect whether the vehicle travels in the passing lane, and providing, via a driver-vehicle interface, a warning to a driver based on a peripheral state of the vehicle when the vehicle travels in the passing lane.

The at least one first electric device may include at least one of a navigation apparatus and a transport protocol experts group (TPEG) apparatus, while the at least one second electric device may include at least one of a sensor and/or an imaging device (e.g., camera, video camera or the like) configured to monitor the road ahead of the subject vehicle. The driver-vehicle interface may include at least one indicator included in a dashboard. The specific lane may include a bus lane or a bus exclusive lane. The detection of whether the vehicle travels in the passing lane may include sensing a left or right guardrail using an imaging device mounted within the vehicle, measuring a distance between the guardrail and the vehicle, and determining that the vehicle travels in the passing lane when the distance is within a predetermined range.

Additionally, the detection of whether the vehicle travels in the passing lane may include receiving the driving restriction information from at least one of a navigation apparatus and a transport protocol experts group (TPEG) apparatus and adjusting the predetermined range based on the driving restriction information. The detection of whether the vehicle travels in the passing lane may further include sensing a left or right lane using an imaging device mounted within the vehicle, and detecting a type of the lane based on a color and shape of the lane and determining whether the vehicle travels in the passing lane based on the detected type of the vehicle.

Further, the detection of whether the vehicle travels in the passing lane may include determining whether the vehicle travels in the passing lane based on whether a lane having the driving restriction information is included in the lane sensed using the imaging device. The detection of whether the vehicle travels in the passing lane may include sensing neighboring vehicles traveling in a left or right lane using an imaging device mounted within the vehicle, and analyzing types of the sensed neighboring vehicles and determining that the vehicle travels in the passing lane when consecutively sensed neighboring vehicles are related to the driving restriction.

The providing of the warning to the driver based on the peripheral state of the vehicle may include providing the warning when a distance from a neighboring vehicle is greater than a predetermined range and interrupting or stopping the warning when the distance from the neighboring vehicle is within the predetermined range. The predetermined range may be determined by speeds of the vehicle and the neighboring vehicle. The providing of the warning to the driver based on the peripheral state of the vehicle may include providing the warning when a neighboring vehicle is not sensed and the vehicle travels at a speed less than a set speed limit of the road on which the vehicle is being driven.

The providing of the warning to the driver based on the peripheral state of the vehicle may further include determining whether the vehicle is passing a neighboring vehicle and interrupting or stopping the warning when the vehicle is passing the neighboring vehicle. The determination of whether the vehicle is passing the neighboring vehicle may include sensing a speed of the neighboring vehicle located in a traveling direction of the vehicle, comparing a speed of the vehicle and the speed of the neighboring vehicle, and determining whether the vehicle is passing the neighboring vehicle based on the comparison results. The providing of the warning to the driver based on the peripheral state of the vehicle may include sensing a neighboring vehicle approaching the vehicle from behind, comparing a speed of the neighboring vehicle and a speed of the vehicle, and providing the warning when the speed of the neighboring vehicle is greater than that of the vehicle.

In another aspect of the present invention, an apparatus for controlling a vehicle operation with an advanced driver assistance system (ADAS) in a vehicle may include a processing system having at least one data processor and at least one computer-readable memory storing a computer program. Herein, the processing system may be programmed to operate the apparatus to detect whether a vehicle travels on a road having regulation information of a passing lane, determine whether a specific lane having driving restriction information is present while the vehicle travels on the road and detect whether the vehicle travels in the passing lane, and provide a warning to a driver based on a peripheral state of the vehicle when the vehicle travels in the passing lane.

Further, a computer-readable recording medium according to another aspect of the present invention may include the vehicle control method using the ADAS. According to another aspect of the present invention, a vehicle control apparatus using an advanced driver assistance system (ADAS) may include a checking unit configured to detect whether a vehicle travels on a road having regulation information of a passing lane, a sensing unit configured to determine whether a specific lane having driving restriction information is present while the vehicle travels on the road and detect whether the vehicle travels in the passing lane, and a controller configured to provide a warning to a driver based on a peripheral state of the vehicle when the vehicle travels in the passing lane.

The checking unit may be configured to receive the regulation information from at least one of a navigation apparatus and a transport protocol experts group (TPEG) apparatus. The specific lane may include a bus lane or a bus exclusive lane. The sensing unit may be configured to sense a left or right guardrail using an imaging device mounted within the vehicle, measure a distance between the guardrail and the vehicle, and determine that the vehicle travels in the passing lane when the distance is within a predetermined range.

The sensing unit may further be configured to receive the driving restriction information from at least one of a navigation apparatus and a transport protocol experts group (TPEG) apparatus and adjust the predetermined range based on the driving restriction information. The sensing unit may be configured to sense a left or right lane using an imaging device mounted within the vehicle, detect a type of the lane based on a color and shape of the lane and determine whether the vehicle travels in the passing lane based on the detected type of the vehicle.

Additionally, the sensing unit may be configured to determine whether the vehicle travels in the passing lane based on whether a lane having the driving restriction information is included in the lane sensed using the imaging device. The sensing unit may be configured to sense neighboring vehicles traveling in a left or right lane using an imaging device mounted within the vehicle, analyze types of the sensed neighboring vehicles and determine that the vehicle travels in the passing lane when consecutively sensed neighboring vehicles are related to the driving restriction.

The controller may be configured to provide a driver with the warning when a distance from a neighboring vehicle is greater than a predetermined range and interrupt or stop the warning when the distance from the neighboring vehicle is within the predetermined range. The predetermined range may be determined by speeds of the vehicle and the neighboring vehicle. The controller may be configured to provide the warning when a neighboring vehicle is not sensed and the vehicle travels at a speed less than a speed limit of the road. The controller may be configured to determine whether the vehicle is passing a neighboring vehicle and interrupt or stop the warning when the vehicle is passing the neighboring vehicle.

Further, the controller may be configured to sense or detect a speed of the neighboring vehicle located in a travel direction of the vehicle, compare a speed of the vehicle and the speed of the neighboring vehicle, and determine whether the vehicle is passing the neighboring vehicle based on the comparison result. The controller may be configured to sense a neighboring vehicle approaching the vehicle from behind, compare a speed of the neighboring vehicle and a speed of the vehicle, and provide the warning when the speed of the neighboring vehicle is greater than that of the vehicle.

The effects of the apparatus according to the present invention will now be described.

In the present invention, a vehicle may recognize whether a lane, in which the vehicle is currently traveling, is a passing lane based on information regarding a region in which the vehicle is currently traveling and provide a driver with information corresponding to a law and regulation changed according to environment, thereby ensuring safety. In the present invention, it may be possible to provide a driver with information regarding a passing lane or a guide based on the operation state of a vehicle and a lane, in which the vehicle is currently traveling, to increase reliability of an advanced driver assistance system (ADAS).

The effects obtained by the present invention are not limited to the above-described effects and the other advantages of the present invention will be more clearly understood from the following detailed description

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings:

FIGS. 2A-2B are diagrams illustrating a first vehicle control method according to an exemplary embodiment of the present invention;

FIGS. 3A-3B are diagrams illustrating a second vehicle control method according to an exemplary embodiment of the present invention;

FIGS. 5A-5B are diagrams illustrating a fourth vehicle control method according to an exemplary embodiment of the present invention;

FIGS. 6A-6B are diagrams illustrating a fifth vehicle control method according to an exemplary embodiment of the present invention;

DETAILED DESCRIPTION

Figure 1:
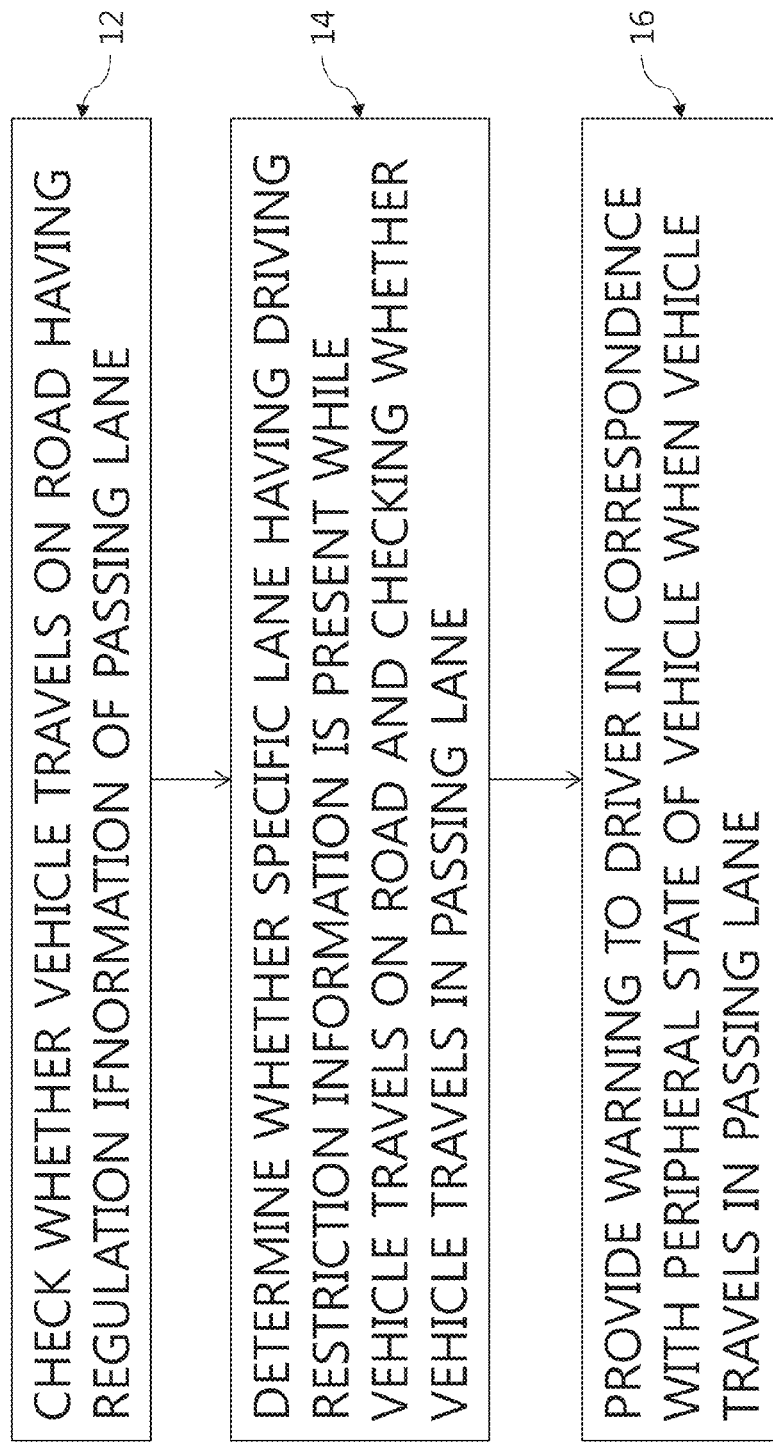
FIG. 1 is a diagram illustrating a vehicle control method using an advanced driver assistance system (ADAS) according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings. The suffixes "module" and "unit" of elements herein are used for convenience of description and thus can be used interchangeably and do not have any distinguishable meanings or functions. In the following description of the embodiments, it will be understood that, when each element is referred to as being formed "on" or "under" the other element, it can be directly "on" or "under" the other element or be indirectly formed with one or more intervening elements therebetween. In addition, it will also be understood that "on" or "under" the element may mean an upward direction and a downward direction of the element. The term "coupled" or "operatively coupled" as used herein, is defined as connected, although not necessarily directly, and not necessarily mechanically.

In the description of the invention, detailed explanations of related art are omitted when it is deemed that they may unnecessarily obscure the essence of the invention. The features of the invention will be more clearly understood from the accompanying drawings and should not be limited by the accompanying drawings. It is to be appreciated that all changes, equivalents, and substitutes that do not depart from the spirit and technical scope of the invention are encompassed in the invention. Notably, the various method described herein below may be executed by a vehicle controller having a processor and a memory.

FIG. 1 is a diagram illustrating a vehicle control method using an advanced driver assistance system (ADAS). As shown, the vehicle control method using the ADAS may include detecting whether a vehicle travels on a road having regulation information of a passing lane (12), determining whether a specific lane having driving restriction information is present while driving on a road to detect whether the vehicle travels in a passing lane (14) and providing a warning to a driver based on a peripheral state of the vehicle when the vehicle travels in the passing lane (16).

When the vehicle travels in the passing lane, it is necessary to inform a user or a driver that the vehicle is currently traveling in the passing lane. Therefore, it may be possible to lead or guide the user or the driver to drive the vehicle in the general driving lane, not in the passing lane, unless the vehicle passes a neighboring vehicle. In particular, the regulation information may be received from at least one of a navigation apparatus and a transport protocol experts group (TPEG) apparatus. For example, a local government or an executive organ may define a leftmost lane of an expressway as a passing lane or fast lane, regard a vehicle traveling slowly in the passing lane as hindering the flow of traffic on the road and impose a penalty or sanction on the driver for violation of the traffic regulations. Although the leftmost lane is defined as the passing lane, a rightmost lane may be determined as a passing lane according to local road environments.

In addition, a specific lane may include a bus lane or a bus exclusive lane. The leftmost or rightmost lane may not be a passing lane according to local road environments. For example, when a leftmost lane is an exclusive lane for public transportation such as bus, a second left lane may be a passing lane. Such an exclusive lane may be determined according to a local road condition, traffic congestion and traffic volume and may be predetermined by a government or a law enforcement agency. A specific lane may be a permanent exclusive lane or may be used as an exclusive lane only during a specific time period (e.g., for a limited period of time).

Regulation information or driving restriction information may be changed according to region or time but is predetermined and thus the ADAS may be configured to store or receive the information while driving the vehicle. The vehicle control method or apparatus based on such information may prevent a driver from violating regulations while operating the vehicle or lead the driver not to hinder the flow of traffic on the road.

In a conventional method of warning against driving the vehicle in a passing lane, a driver may be warned when a vehicle travels in the passing lane at a predetermined speed or greater for a predetermined amount of time or more. In addition, only when driving conditions, such as a predetermined speed or greater and a predetermined amount of time or more, are satisfied, the warning is delivered to the driver. However, when the driving condition in the passing lane is determined only using the predetermined speed and a time when the vehicle travels at the predetermined speed or greater, the warning may not be delivered to the driver or user when the vehicle travels at the predetermined speed or less or for the predetermined amount of time or less.

However, violation of traffic regulations may be changed according to region and thus a driver using the ADAS may drive the vehicle in the passing lane without knowingly violating traffic regulations. In addition, even when another vehicle is detected within a predetermined distance from a vehicle traveling in a passing lane, the ADAS does not need to provide a warning to a driver when the vehicle is passing a neighboring vehicle (that is, a preceding vehicle traveling in a driving lane).

The passing lane may be mainly used to pass another vehicle and a vehicle, which has passed another vehicle, may then return to a driving lane. Accordingly, whether a vehicle is currently traveling on an expressway or the like, including a passing lane having a regulation may be determined using a navigation apparatus (e.g., global positioning system (GPS)) mounted within the vehicle. When the vehicle travels on a road including a passing lane having a regulation, the current driving lane of the vehicle may be determined by combining a lane detected by a front recognition sensor (e.g., a radar, an imaging device, etc.) mounted extraneous to the vehicle and stationary object information.

In addition, information regarding the front side, the front lateral side and rear lateral side of the vehicle may be acquired using a front recognition sensor and a rear lateral recognition sensor mounted within the vehicle to detect whether a passing vehicle is present, thereby providing a warning to the driver. An apparatus for providing a warning regarding a passing lane may provide a warning to a driver according to environments when the driver travels in the passing lane, thereby ensuring safety and improving the flow of traffic. For example, the ADAS may be configured to determine whether the vehicle enters an expressway using information provided by the navigation apparatus (GPS). When a passing lane is not a regulation object on a road other than an expressway, this road may be excluded from a warning object.

Further, when a vehicle enters an expressway, a passing lane may be determined using information of a front imaging device (e.g., video camera or the like) and radar sensor mounted within the vehicle. In the case of a general expressway, the passing lane may be determined by combining solid-line lane information from the front imaging device and a distance from a left guardrail from the front radar sensor. In the case of an expressway having a bus lane, the passing lane may be determined using left lane information and information on a left guardrail from the radar sensor when a bus is not present and using bus information from the imaging device when a bus is present.

In response to determining whether the vehicle is traveling in the passing lane, whether a neighboring vehicle traveling at a slower speed than the vehicle (e.g., subject vehicle, present vehicle, traveling vehicle) is present in front of the vehicle in a right lane may be determined and whether a neighboring vehicle traveling at a speed greater than the subject vehicle speed is present behind the vehicle may be determined. Accordingly, the controller may be configured to that the vehicle is passing the neighboring vehicle or the vehicle is not capable (e.g., dangerous risk) to return to the driving lane, a warning may not be provided to the driver. In contrast, when a neighboring vehicle located in front of the vehicle is traveling at a faster speed than the subject vehicle or a neighboring vehicle located behind the vehicle is traveling at a slower speed than the subject vehicle, a warning may be provided to the driver and thus, the vehicle may return to the driving lane.

FIGS. 2A-2B are diagrams illustrating a first vehicle control method. More specifically, FIG. 2A shows an environment in which a vehicle 2 travels and FIG. 2B shows a control method in this environment. As shown, in the first vehicle control method, step 14 (see FIG. 1) of detecting whether the vehicle travels in the passing lane may include sensing a left or right guardrail using the imaging device mounted within the vehicle (22), measuring a distance d1 between the guardrail and the subject vehicle (24) and determining that the subject vehicle travels in the passing lane when the distance is within a predetermined range (26).

The vehicle 2 may further be configured to detect the front side, lateral side and rear side of the vehicle using the sensor, the imaging device and radar apparatus mounted therein and a detection area associated with operation is shown around the vehicle 2, to aid in understanding. Referring to FIG. 2A, under the assumption that the vehicle 2 travels in a leftmost lane of a road, a median strip (guardrail) may be mounted at the left side of the lane in which the vehicle 2 travels. The vehicle 2 may be configured to detect the median strip using the front sensor and measure a distance d1 between the median strip and the vehicle 2. For example, when the measured distance d1 is less than the width of one lane, the controller may be configured to determine that the vehicle 2 travels in a lane closest to the median strip and the lane may be a passing lane. Although the vehicle 2 may use the front sensor, the guardrail may be detected and a distance between the guardrail and the vehicle may be measured using a lateral sensor.

FIGS. 3A-3B are diagrams illustrating a second vehicle control method. More specifically, FIG. 3A shows an environment in which a vehicle 2 travels and FIG. 3B shows a control method in this environment. As shown, in the second vehicle control method, step 14 (see FIG. 1) of detecting whether the vehicle travels in the passing lane may include sensing a left or right lane using the imaging device mounted within the vehicle, detecting the type of the lane based on the color and shape of the lane (34) and determining whether the vehicle travels in the passing lane based on the detected type of lane (36).

Referring to FIG. 3A, a median strip (guardrail) may not be mounted on the road on which the vehicle 2 travels. However, even when the median strip (guardrail) is not mounted, the shape of the lane of the road may not be marked by a dotted line but may be marked by a sold line. In addition, a centerline may be marked by a plurality of solid lines. The color and shape of the lane marked on the road may be changed according to region.

The ADAS may be configured to recognize the shapes of left and right lanes of the lane, in which the vehicle travels, using the sensor or an imaging device mounted within the vehicle. In particular, even when the median strip (guardrail) is not mounted on the road, whether the lane in which the vehicle 2 travels is a leftmost lane or a rightmost lane may be determined. Therefore, it may be possible to determine whether the lane, in which the vehicle 2 is currently traveling, is a passing lane.

Figures 4A, 4B:
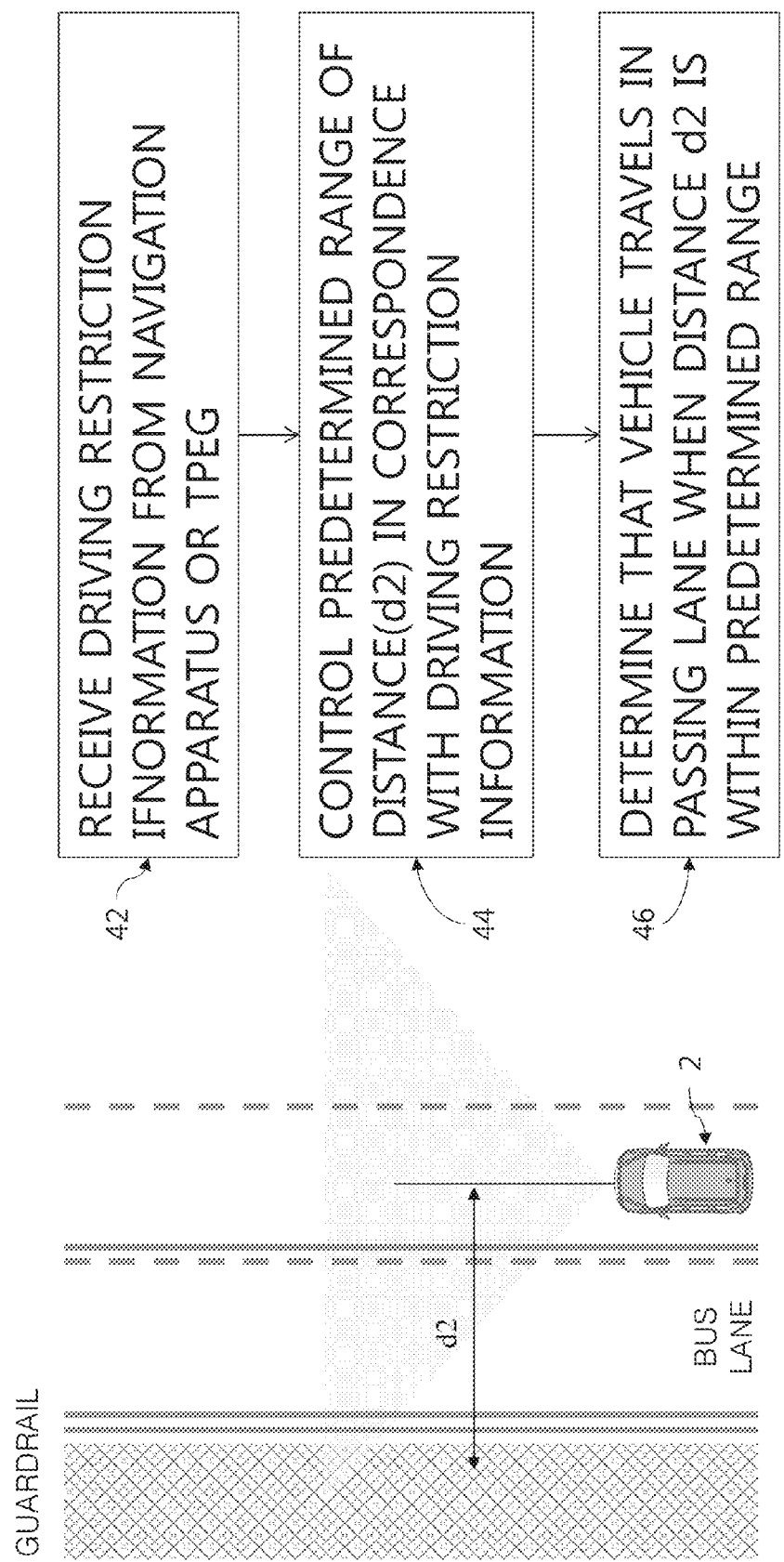
FIGS. 4A-4B are diagrams illustrating a third vehicle control method according to an exemplary embodiment of the present invention.

FIGS. 4A-4B are diagrams illustrating a third vehicle control method. More specifically, FIG. 4A shows an environment in which a vehicle 2 travels and FIG. 4B shows a control method in this environment. As shown, in the third vehicle control method, step 14 (see FIG. 1) of detecting whether the vehicle travels in the passing lane may include receiving driving restriction information from at least one of a navigation apparatus and a TPEG apparatus (42), adjusting a predetermined range of a distance d2 based on the driving restriction information (44) and determining that the vehicle travels in the passing lane when the distance d2 is within the predetermined range (46).

FIG. 4A shows an assumption that a median strip (guardrail) is mounted on a road on which the vehicle 2 travels. In addition, the vehicle 2 may be configured to receive information indicating that a bus lane is present in a current driving section from the navigation apparatus or the TPEG apparatus. The bus lane is merely exemplary and a leftmost (or rightmost) lane may not be a passing lane but may be a lane having driving restriction according to regional road environments. Meanwhile, such driving restriction information may be predetermined according to region and time and thus may be received from the navigation apparatus or the TPEG apparatus.

When the leftmost lane is a bus lane, not a passing lane, the vehicle 2 may be configured to detect the median strip (guardrail) and measure the distance d2 between the median strip and the vehicle 2 to determine whether the vehicle travels in the passing lane in consideration of the bus lane. For example, unlike FIGS. 2A-2B, instead of the width of one lane, the width of two lanes may be used as a comparison criterion. When the distance d2 between the median strip and the vehicle 2 is less than the width of two lanes, the vehicle 2 may be determined to be traveling in the passing lane.

FIGS. 5A-5B are diagrams illustrating a fourth vehicle control method. More specifically, FIG. 5A shows an environment in which a vehicle 2 travels and FIG. 5B shows a control method in this environment. As shown, in the fourth vehicle control method, step 14 (see FIG. 1) of detecting whether the vehicle travels in the passing lane may include sensing a left or right lane using the imaging device mounted within the vehicle (52) and determining whether the vehicle travels in the passing lane based on the type of lane (54).

FIG. 5A is illustrated under the assumption that the shape of the lane of the road may be identified using the imaging device mounted within the vehicle 2 (similar to FIG. 3A). The vehicle may be configured to distinguish between the centerline and the other lane or among the centerline, the bus lane and the other lane using the imaging device. When the vehicle 2 distinguishes between the centerline and the other lane, the vehicle 2 may be configured to sense the centerline and measure a distance d3 between the centerline and the vehicle 2. The ADAS may be configured to determine that the vehicle 2 travels in the passing lane when the distance d3 between the centerline and the vehicle 2 is less than the width of two lanes, not the width of one lane, based on information indicating that the bus lane is present. When the vehicle 2 distinguishes among the centerline, the bus lane and the other lane, the vehicle 2 may be configured to sense the bus lane and measure a distance d4 between the bus lane and the vehicle 2. In particular, when the distance d4 between the bus lane and the vehicle 2 is less than the width of one lane, the vehicle may be determined to be traveling in the passing lane.

FIGS. 6A-6B are diagrams illustrating a fifth vehicle control method. More specifically, FIG. 6A shows an environment in which a vehicle 2 travels and FIG. 6B shows a control method in this environment. As shown, in the fifth vehicle control method, step 14 (see FIG. 1) of detecting whether the vehicle travels in the passing lane may include sensing neighboring vehicles traveling in a left or right lane using the imaging device mounted within the vehicle (62), analyzing the types of the sensed neighboring vehicles (64)

and determining that the vehicle travels in the passing lane when consecutively sensed neighboring vehicles are related to driving restriction (66).

FIG. 6A illustrates the assumption that the vehicle 2 cannot travel (e.g., is restriction from traveling) in a lane having driving restriction information. When a bus lane corresponding to the driving restriction information is present, a similar type of vehicle 4 may be permitted travel in the lane based on the driving restriction information. When a plurality of vehicles 4 such as buses travels in the bus lane, the vehicle 2 may not sense the centerline or the median strip (guardrail) located at the left side of the bus lane. In particular, the vehicle 2 may be configured to recognize that the plurality of similar vehicles 4 or the vehicle 4 that corresponds to the driving restriction information travels in a neighboring lane (e.g., a left lane) and determine that the neighboring lane is a lane (e.g., bus lane) that corresponds to driving restriction information. The vehicle 2 may thus be configured to determine whether the vehicle travels in the passing lane based on the lane that corresponds to the driving restriction information.

Figure 7:
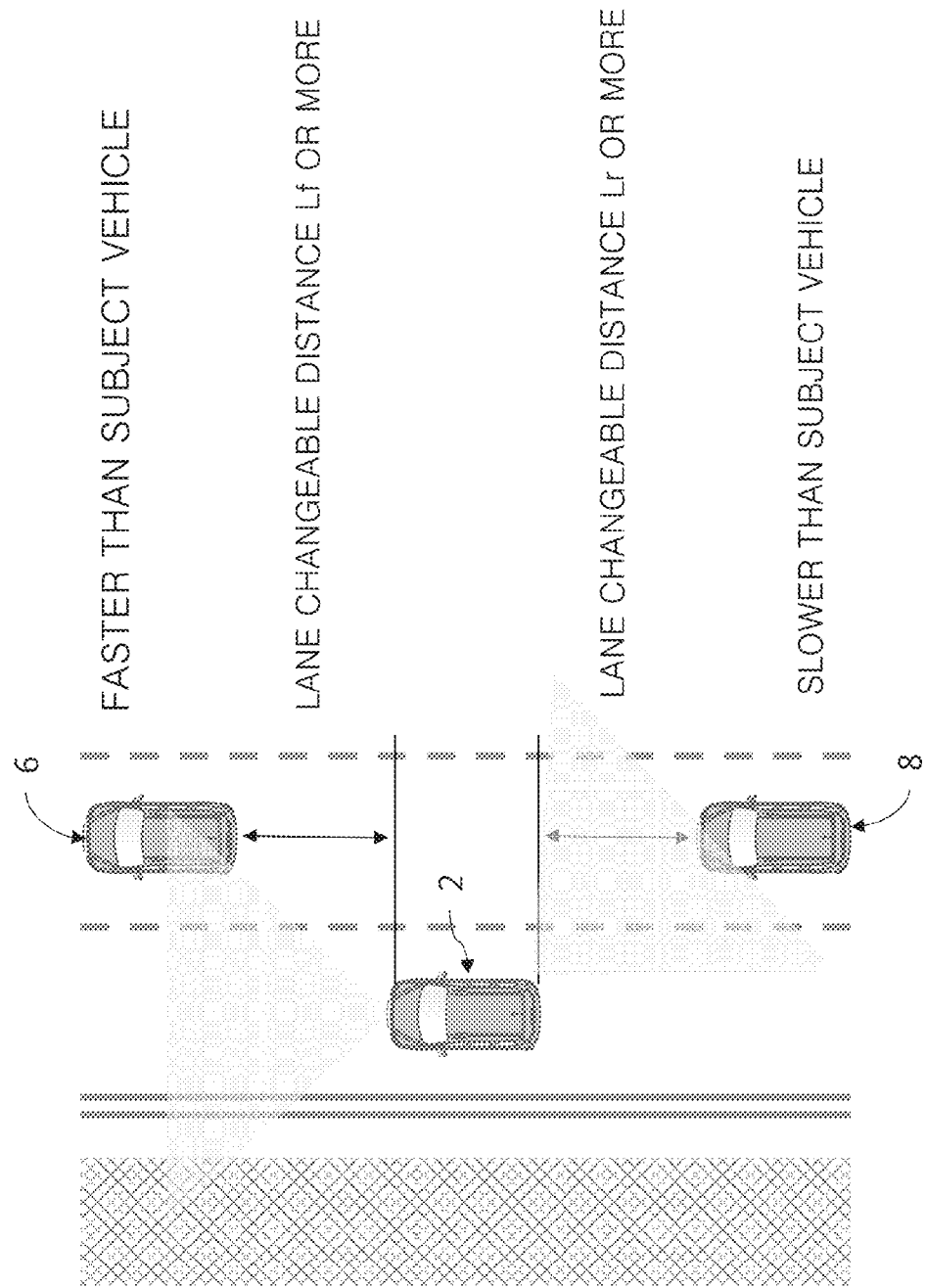
FIG. 7 is a diagram illustrating a sixth vehicle control method according to an exemplary embodiment of the present invention.

FIG. 7 is a diagram illustrating a sixth vehicle control method. As shown, in the sixth vehicle control method, step 16 (see FIG. 1) of providing the warning to the driver based on the peripheral state of the vehicle 2 may include providing the warning to a driver when distances from neighboring vehicles 6 and 8 to the subject vehicle 2 are beyond or greater than a predetermined range and interrupting or stopping the warning when the distances from the neighboring vehicles 6 and 8 to the subject vehicle 2 are within the predetermined range.

For example, in response to determining that the vehicle 2 (e.g., subject vehicle 2) is traveling in the passing lane, the vehicle 2 may be configured to recognize the peripheral situation while being driven. When the vehicle 6 traveling in front of the vehicle 2 is traveling at a speed that is faster than the speed of the subject vehicle 2 and the vehicle 8 traveling behind the vehicle 2 is traveling to a speed that is slower than the speed of the subject vehicle 2, a distance (e.g., lane changeable distances Lf and Lr) necessary to change from the passing lane to the driving lane may be ensured. Accordingly, the vehicle 2 may be configured to output a warning to the driver using the ADAS to guide the driver to change from the passing lane to the driving lane.

In contrast, when the vehicle 6 traveling in front of the vehicle 2 is traveling at a speed that is slower than the speed of the subject vehicle 2 and the vehicle 8 traveling behind the vehicle 2 is traveling at a speed that is faster than the speed of the subject vehicle 2, the distance (e.g., lane changeable distances Lf and Lr) necessary to change from the passing lane to the driving lane may not be ensured. Accordingly, when the vehicle 2 provides a warning to the driver using the ADAS, safe driving of the driver may not be ensured and thus the warning for guiding the driver to change from the passing lane to the driving lane may not be provided. Particularly, a predetermined range of the distance (e.g., lane changeable distances Lf and Lr) necessary to change from the passing lane to the driving lane may be determined by the speeds of the vehicle 2 and the neighboring vehicles 6 and 8 or may be determined by a distance between vehicles determined according to a regional rule, regardless of the speeds of the vehicle 2 and the neighboring vehicles 6 and 8.

Figure 8:
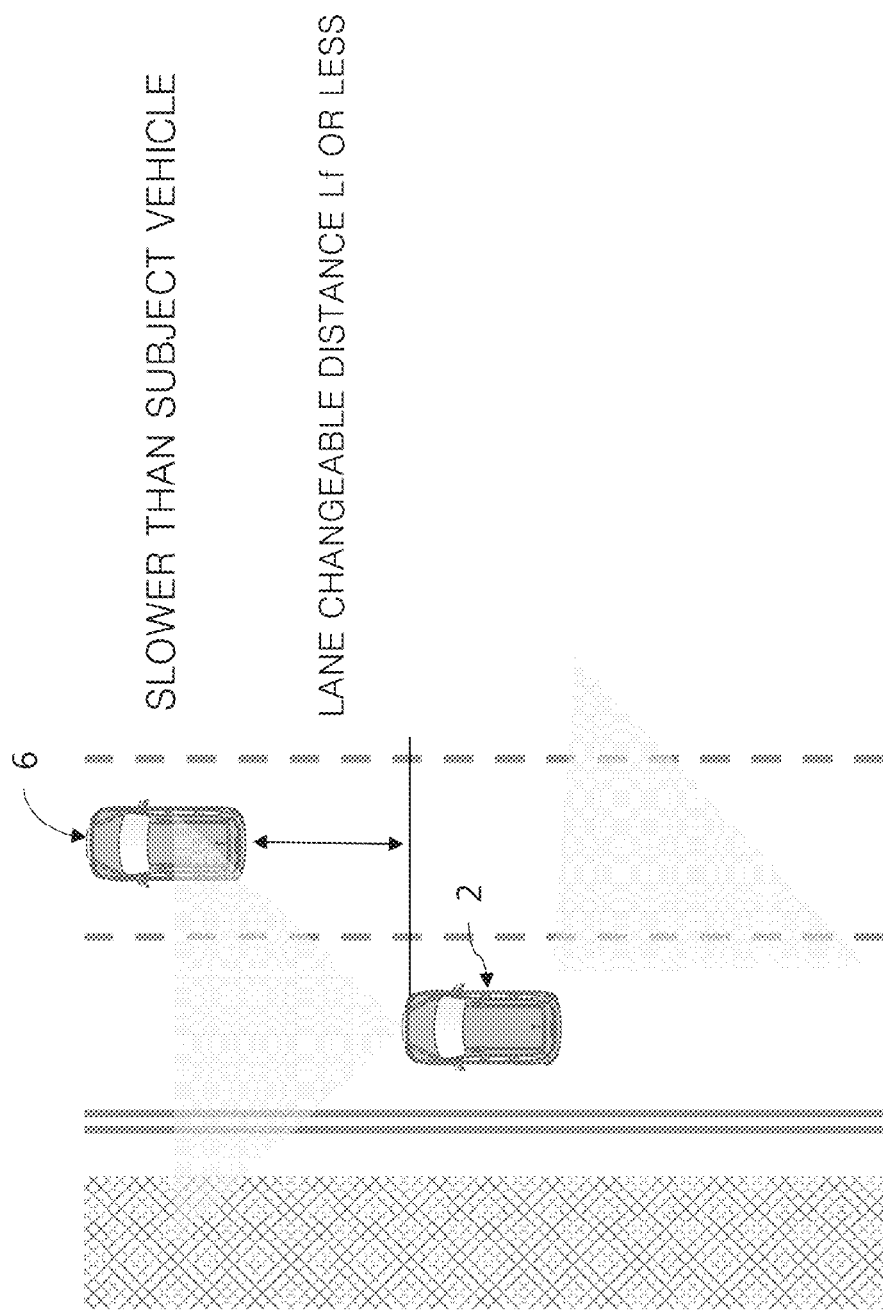
FIG. 8 is a diagram illustrating a seventh vehicle control method according to an exemplary embodiment of the present invention.

FIG. 8 is a diagram illustrating a seventh vehicle control method. As shown, in the seventh vehicle control method, step 16 (see FIG. 1) of providing the warning to the driver based on the peripheral state of the vehicle 2 may include determining whether the vehicle is passing a neighboring vehicle and interrupting or stopping the warning in response to determining that the vehicle is passing the neighboring vehicle. In addition, step 16 (see FIG. 1) of determining whether the vehicle is passing the neighboring vehicle may include sensing the speed of the neighboring vehicle located in the travel direction of the vehicle, comparing the speeds of the vehicle and the neighboring vehicle and determining whether the vehicle is passing the neighboring vehicle based on the comparison.

For example, under the assumption that the vehicle 2 is traveling in the passing lane, the vehicle 2 may be configured to sense the neighboring vehicle 6 in the travel direction (e.g., at the front side). Accordingly, when the speed of the neighboring vehicle 6 is less than that of the vehicle 2, the vehicle 2 may be determined to be passing the neighboring vehicle 6 and thus a warning indicating that the vehicle is traveling in the passing lane may not be output to the driver. In particular, when the distance between the neighboring vehicle 6 and the vehicle 2 is within the lane changeable distance Lf, the warning may not be provided to the driver, for safety reason.

Figure 9:
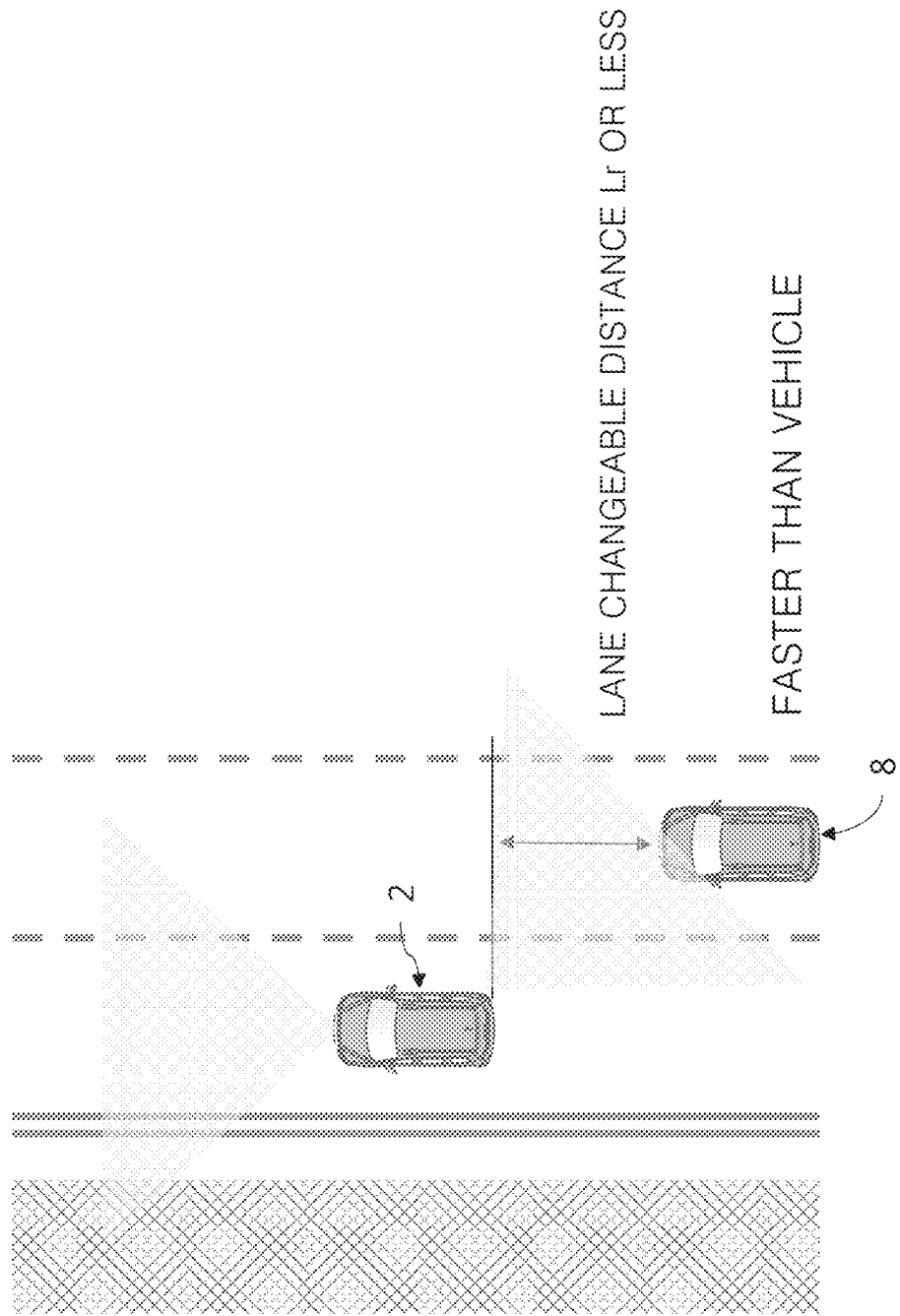
FIG. 9 is a diagram illustrating an eighth vehicle control method according to an exemplary embodiment of the present invention.

FIG. 9 is a diagram illustrating an eighth vehicle control method. As shown, in the eighth vehicle control method, in step 16 (see FIG. 1) of providing the warning to the driver based on the peripheral state of the vehicle 2, when the vehicle 2 senses a neighboring vehicle 9 approaching the vehicle from behind, the speeds of the vehicle 2 and the neighboring vehicle may be compared and a warning may not be provided when a distance between vehicles is within a lane changeable distance Lr. In particular, although the vehicle is traveling in the passing lane, the neighboring vehicle 8 may utilize or enter the driving lane to pass the vehicle 2. Therefore, when guiding the driver of the vehicle 2 to change lanes, safe driving may not be ensured.

Figure 10:
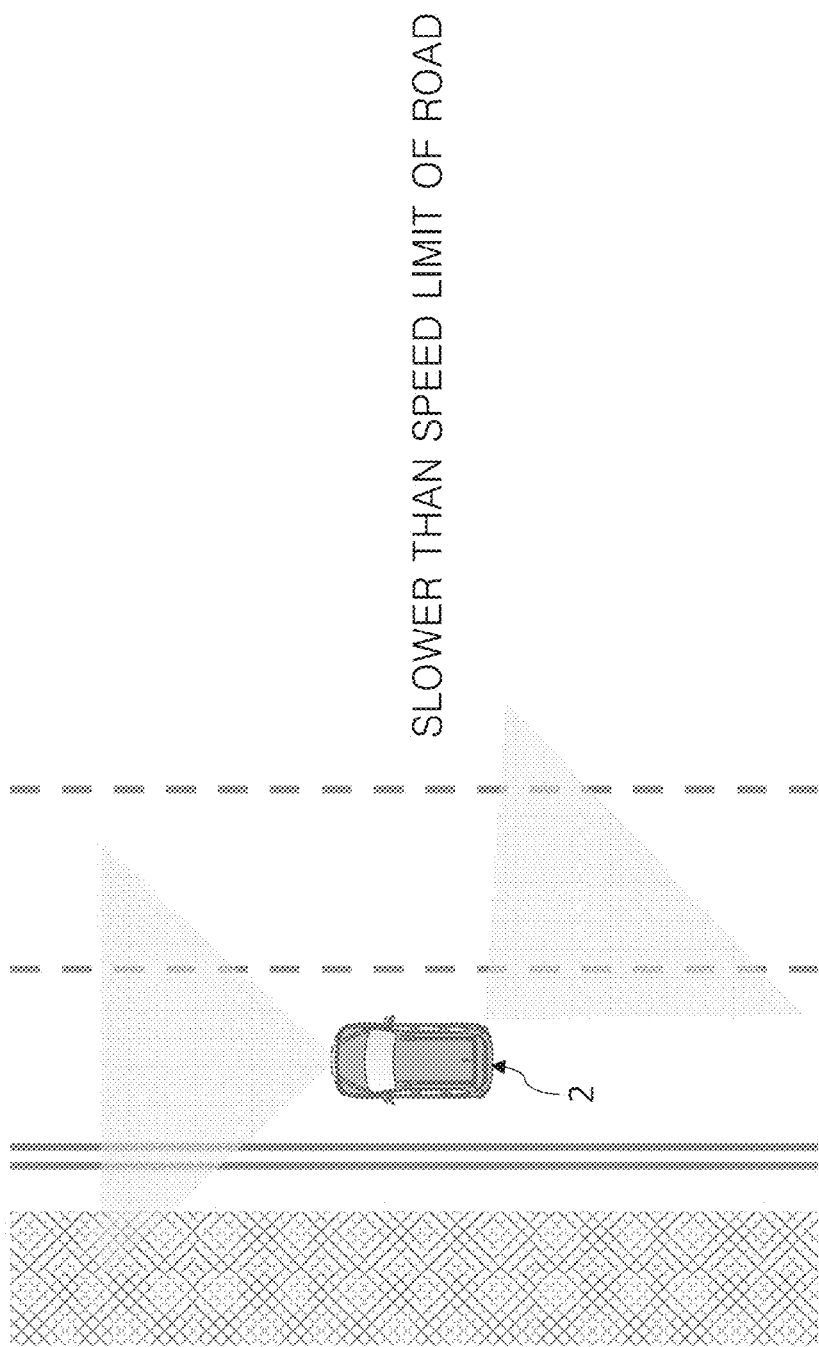
FIG. 10 is a diagram illustrating a ninth vehicle control method according to an exemplary embodiment of the present invention.

FIG. 10 is a diagram illustrating a ninth vehicle control method. As shown, in the ninth vehicle control method, step 16 (see FIG. 1) of providing the warning to the driver based on the peripheral state of the vehicle 2 may include providing a warning when a neighboring vehicle is not sensed and the speed of the vehicle 2 is less than a speed limit of the road. For example, a neighboring vehicle may not be sensed while the vehicle 2 travels in the passing lane. In particular, since the vehicle 2 may change lanes, when the vehicle 2 travels at a speed less than the speed limit of the road, a warning for guiding the driver to use the driving lane may be output to the driver.

Figure 11:
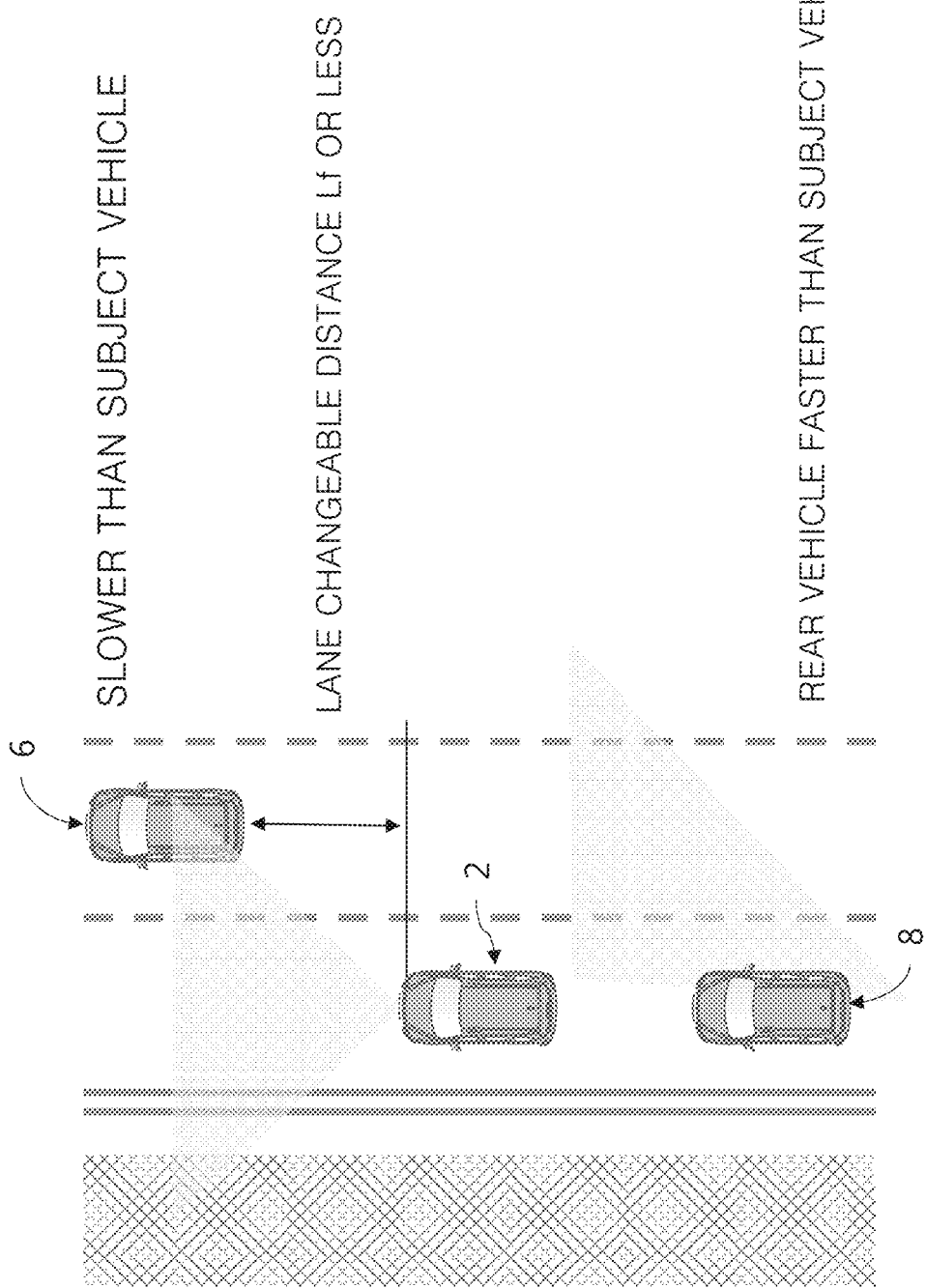
FIG. 11 is a diagram illustrating a tenth vehicle control method according to an exemplary embodiment of the present invention.

FIG. 11 is a diagram illustrating a tenth vehicle control method. As shown, in the tenth vehicle control method, in step 16 (see FIG. 1) of providing the warning to the driver based on the peripheral state of the vehicle 2, a preceding vehicle 6 and a rear vehicle 8 may be sensed and the speed of the preceding vehicle 6 may be less than that of the vehicle 2 and the speed of the rear vehicle 8 may be greater than that of the vehicle 2, and thus, the warning may not be provided to the driver.

More specifically, the vehicle 2 may be determined to be passing the neighboring vehicle 6 since the speed of the vehicle 2 is greater than that of the preceding vehicle 6. When the vehicle 2 is currently passing the neighboring vehicle, although the neighboring vehicle 8 approaches the vehicle 2 from behind at a higher speed, the vehicle 2 may not change from the passing lane to the driving lane. Accordingly, the ADAS may delay provision of the warning to the driver to guide the driver to change from the passing lane to the driving lane after the driver of the vehicle 2 passes the preceding vehicle 6.

Figure 12:
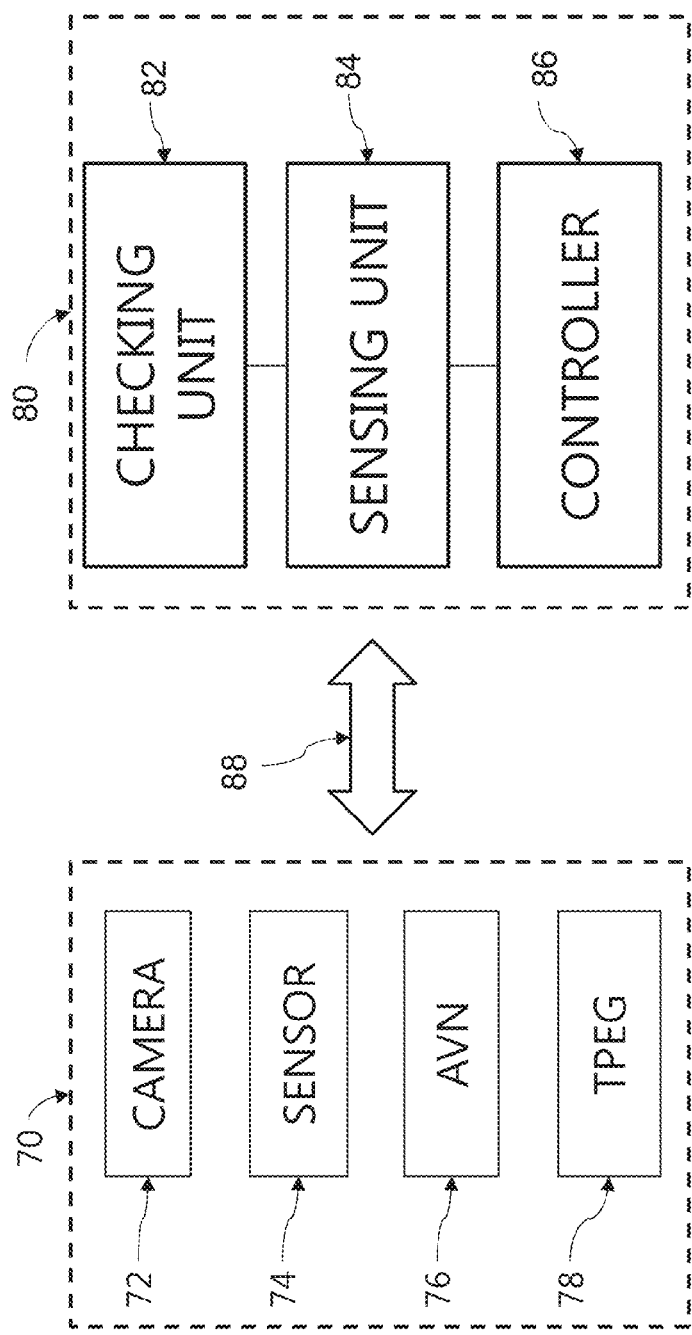
FIG. 12 is a diagram illustrating a vehicle control apparatus using an advanced driver assistance system (ADAS) according to an exemplary embodiment of the present invention.

FIG. 12 is a diagram illustrating a vehicle control apparatus using an advanced driver assistance system (ADAS). As shown, the vehicle control apparatus 80 using the ADAS may be configured to communicate (88) with a plurality of electronic apparatuses 70 mounted within the vehicle. For example, the plurality of electronic apparatuses 70 mounted within the vehicle may include an imaging device 72, a sensor 74, an audio-video-navigation apparatus 76 and a TPEG apparatus 78.

The vehicle control apparatus 80 using the ADAS may include a checking unit 82 configured to detect whether the vehicle travels on a road having passing lane regulation information, a sensing unit 84 configured to determine whether a specific lane having driving restriction information is present while the vehicle travels on the road to sense whether the vehicle travels in the passing lane and a controller 86 configured to output a warning to a driver based on the peripheral state of the vehicle when the vehicle travels in the passing lane. The various units of the apparatus may be operated by the controller 86.

In addition, the checking unit 82 may be configured to receive regulation information from at least one of the navigation apparatus 76 and the TPEG apparatus 78. The specific lane may include a bus lane or a bus exclusive lane. The sensing unit 84 may be configured to sense a left or right guardrail using the imaging device 72 mounted within the vehicle, measure a distance between the guardrail and the vehicle and determine that the vehicle travels in the passing lane when the distance is within a predetermined range. The imaging device 72 may be disposed at the front side, lateral side and rear side of the vehicle 2. In addition, the sensing unit 84 may be configured to sense the guardrail and the vehicle using a radar apparatus (not shown) in addition to the imaging device 72.

Furthermore, the sensing unit 84 may be configured to receive driving restriction information from the navigation apparatus 76 or the TPEG apparatus 78 and adjust the predetermined range based on the driving restriction information. The driving restriction information may include information regarding a bus lane. In addition, the sensing unit 84 may be configured to determine whether the passing lane is present based on whether a lane having driving restriction information is included in a lane sensed using the imaging device.

The sensing unit 84 may further be configured to sense a left or right lane using the imaging device mounted within the vehicle, detect the type of the lane based on the color and shape of the lane, and determine whether the vehicle travels in the passing lane based on the type of the lane. In addition, the sensing unit 84 may be configured to sense neighboring vehicles traveling in a left or right lane using the imaging device mounted within the vehicle, analyze the types of the sensed neighboring vehicles and determine that the vehicle travels in the passing lane when the consecutively sensed neighboring vehicles are related to driving restriction.

The sensing unit 84 may individually operate according to the apparatuses mounted within the vehicle and the operation environment and may have overlapping functions. When the sensing unit 84 determines whether the vehicle travels in the passing lane using a plurality of functions, accuracy may be improved. When the sensing unit 84 determines that the vehicle travels in the passing lane, the controller 86 may be configured to output a warning when a distance from the neighboring vehicle is greater than or beyond the predetermined range and interrupt or stop the warning when the distance from the neighboring vehicle is within the predetermined range. The predetermined range may be determined by the speeds of the vehicle and the neighboring vehicle.

In addition, the controller 86 may be configured to output the warning when a neighboring vehicle is not sensed and the vehicle travels at a speed less than the set speed limit of the road. In addition, the controller 86 may be configured to determine whether the vehicle is passing a neighboring vehicle and interrupt or stop the warning when the vehicle is passing the neighboring vehicle. The controller 86 may further be configured to sense the speed of the neighboring vehicle located in the travel direction of the vehicle, compare the speeds of the vehicle and the neighboring vehicle and determine whether the vehicle is passing the neighboring vehicle based on the comparison. In addition, the controller 86 may be configured to sense a neighboring vehicle approaching the vehicle from behind, compare the speeds of the vehicle and the neighboring vehicle and output a warning when the speed of the neighboring vehicle is greater than that of the subject vehicle.

The methods according to the above-described exemplary embodiments may be stored in a computer-readable recording medium as a program executed on a computer. Examples of the computer-readable recording medium include a ROM, a RAM, a CD-ROM, a magnetic tape, a floppy disk, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Functional programs, code, and code segments needed to realize the embodiments herein can be construed by one of ordinary skill in the art.

Those skilled in the art will appreciate that the present invention may be carried out in other specific ways than those set forth herein without departing from the spirit and essential characteristics of the present invention. Accordingly, the above detailed description is not to be construed as limiting the present invention in all aspects and should be considered exemplary. The scope of the present invention should be determined by reasonable interpretation of the accompanying claims and all equivalent modifications made without departing from the present invention should be included in the following claims.

What is claimed is:

1. A vehicle control method using an advanced driver assistance system (ADAS), the vehicle control method comprising:
   determining whether a subject vehicle travels on a road having regulation information of a passing lane based at least on a first information delivered via a wireless network and/or provided by at least one first electric device mounted within the subject vehicle;
   determining whether a specific lane having driving restriction information is present while the subject vehicle travels on the road, based at least on a second information collected by at least one second electric device mounted within the subject vehicle, to detect whether the subject vehicle travels in the passing lane; and
   outputting, via a driver-vehicle interface, a warning to a driver based on a peripheral state of the subject vehicle when the subject vehicle travels in the passing lane,
   wherein the at least one first electric device includes at least one of a navigation apparatus and a transport protocol experts group (TPEG) apparatus, and the at least one second electric device includes at least one of a sensor and/or an imaging device configured to monitor the road ahead of the subject vehicle.

2. The vehicle control method according to claim 1, wherein the specific lane includes a bus lane or a bus exclusive lane.

3. The vehicle control method according to claim 1, wherein the detection of whether the subject vehicle travels in the passing lane includes:
sensing a left or right guardrail using the imaging device mounted within the vehicle;
measuring a distance between the guardrail and the subject vehicle; and
determining that the subject vehicle travels in the passing lane when the distance is within a predetermined range.

4. The vehicle control method according to claim 3, wherein the detection of whether the subject vehicle travels in the passing lane includes:
receiving the driving restriction information from at least one of a navigation apparatus and a transport protocol experts group (TPEG) apparatus; and
adjusting the predetermined range based on the driving restriction information.

5. The vehicle control method according to claim 1, wherein the detection of whether the subject vehicle travels in the passing lane includes:
sensing a left or right lane using the imaging device mounted within the vehicle; and
detecting a type of the lane based on a color and shape of the lane and determining whether the subject vehicle travels in the passing lane based on the detected type of lane.

6. The vehicle control method according to claim 5, wherein the detection of whether the subject vehicle travels in the passing lane further includes:
determining whether the subject vehicle travels in the passing lane based on whether a lane having the driving restriction information is included in the lane sensed using the imaging device.

7. The vehicle control method according to claim 1, wherein the detection of whether the subject vehicle travels in the passing lane includes:
sensing neighboring vehicles traveling in a left or right lane using the imaging device mounted within the vehicle; and
analyzing types of the sensed neighboring vehicles and determining that the subject vehicle travels in the passing lane when consecutively sensed neighboring vehicles are related to the driving restriction.

8. The vehicle control method according to claim 1, wherein the output of the warning to the driver based on the peripheral state of the subject vehicle includes:
outputting the warning when a distance from a neighboring vehicle is greater than a predetermined range; and
interrupting or stopping the output of the warning when the distance from the neighboring vehicle is within the predetermined range.

9. The vehicle control method according to claim 8, wherein the predetermined range is determined by speeds of the subject vehicle and the neighboring vehicle.

10. The vehicle control method according to claim 1, wherein the output of the warning to the driver based on the peripheral state of the subject vehicle includes:
outputting the warning when a neighboring vehicle is not sensed and the subject vehicle travels at a speed less than a set speed limit of the road.

11. The vehicle control method according to claim 10, wherein the output of the warning to the driver based on the peripheral state of the subject vehicle includes:
determining whether the subject vehicle is passing a neighboring vehicle; and
interrupting or stopping the output of the warning when the subject vehicle is passing the neighboring vehicle.

12. The vehicle control method according to claim 11, wherein the determination of whether the subject vehicle is passing the neighboring vehicle includes:
sensing a speed of the neighboring vehicle located in a travel direction of the vehicle;
comparing a speed of the subject vehicle and the speed of the neighboring vehicle; and
determining whether the subject vehicle is passing the neighboring vehicle based on the comparison.

13. The vehicle control method according to claim 11, wherein the output of the warning to the driver based on the peripheral state of the subject vehicle includes:
sensing a neighboring vehicle approaching the subject vehicle from behind;
comparing a speed of the neighboring vehicle and a speed of the subject vehicle; and
outputting the warning when the speed of the neighboring vehicle is greater than the speed of the subject vehicle.

14. An apparatus for executing a vehicle operation with an advanced driver assistance system (ADAS) in a vehicle including a processing system that comprises at least one data processor and at least one computer-readable memory storing a computer program, wherein the processing system is configured to cause the apparatus to:
detect whether a subject vehicle travels on a road having regulation information of a passing lane based at least on first information delivered via a wireless network and/or provided by at least one first electric device mounted within the subject vehicle;
determine whether a specific lane having driving restriction information is present while the subject vehicle travels on the road, based at least on second information collected by at least one second electric device mounted within the subject vehicle, to detect whether the subject travels in the passing lane; and
output a warning to a driver based on a peripheral state of the subject vehicle when the subject vehicle travels in the passing lane,
wherein the at least one first device includes at least one of a navigation apparatus and a transport protocol experts group (TPEG) apparatus, and at least one second electric device includes at least one of a sensor and/or an imaging device configured to monitor the road ahead of the subject vehicle.

15. The apparatus according to claim 14, wherein, to detect whether the subject vehicle travels in the passing lane, the processing system is configured to cause the apparatus to:
sense a left or right guardrail using the imaging device mounted within the subject vehicle;
measure a distance between the guardrail and the subject vehicle; and
determine that the subject vehicle travels in the passing lane when the distance is within a predetermined range.

16. The apparatus according to claim 14, wherein, to detect whether the subject vehicle travels in the passing lane, the processing system is configured to cause the apparatus to:

sense neighboring vehicles traveling in a left or right lane using the imaging device mounted within the vehicle; and analyze types of the sensed neighboring vehicles and determine that the subject vehicle travels in the passing lane when consecutively sensed neighboring vehicles are related to the driving restriction.

17. The apparatus according to claim 14, wherein, to output the warning to the driver based on the peripheral state of the subject vehicle, the processing system is configured to cause the apparatus to:

output the warning when a distance from a neighboring vehicle is greater than a predetermined range; and interrupt or stop the output of the warning when the distance from the neighboring vehicle is within the predetermined range.

18. A vehicle control apparatus using an advanced driver assistance system (ADAS), the vehicle control apparatus comprising:

a checking unit configured to detect whether a subject vehicle travels on a road having regulation information of a passing lane based at least on a first information delivered via a wireless network and/or provided by at least one first electric device mounted within the subject vehicle;

a sensing unit configured to determine whether a specific lane having driving restriction information is present while the subject vehicle travels on the road, based at least on a second information collected by at least one second electric device mounted within the subject vehicle, to detect whether the subject vehicle travels in the passing lane; and a controller configured to output a warning to a driver based on a peripheral state of the subject vehicle when the subject vehicle travels in the passing lane, wherein the at least one first electric device includes at least one of a navigation apparatus and a transport protocol experts group (TPEG) apparatus, and the at least one second electric device includes at least one of a sensor and/or an imaging device configured to monitor the road ahead of the subject vehicle.

19. The vehicle control apparatus according to claim 18, wherein, to detect whether the subject vehicle travels in the passing lane, the sensing unit is configured to:

sense a left or right guardrail using an imaging device mounted within the subject vehicle;

measure a distance between the guardrail and the subject vehicle; and determine that the subject vehicle travels in the passing lane when the distance is within a predetermined range.

20. The vehicle control apparatus according to claim 18, wherein, to detect whether the subject vehicle travels in the passing lane, the sensing unit is configured to:

sense neighboring vehicles traveling in a left or right lane using the imaging device mounted within the vehicle; and analyze types of the sensed neighboring vehicles and determine that the subject vehicle travels in the passing lane when consecutively sensed neighboring vehicles are related to the driving restriction.

* * * * *